United States Patent [19]

Kato et al.

[11] Patent Number: 5,338,178
[45] Date of Patent: Aug. 16, 1994

[54] EMBOSSING METAL HOLD

[75] Inventors: Keizo Kato, Hachioji; Shinkichi Horigome, Tachikawa; Ryo Suzuki, Hachioji; Masaru Ito, Ibaraki, all of Japan

[73] Assignee: Hitachi, Ltd., Tokyo, Japan

[21] Appl. No.: 800,455

[22] Filed: Nov. 27, 1991

[30] Foreign Application Priority Data

Nov. 30, 1990 [JP] Japan .................. 2-337075

[51] Int. Cl.⁵ .................. B29C 59/00; B29D 17/00
[52] U.S. Cl. .................. 425/385; 156/634; 156/664; 264/106; 264/293; 264/344; 425/394; 425/810; 430/323
[58] Field of Search ............. 425/385, 810, D26, D30, 425/394; 264/106, 107, 1.3, 2.5, 220, 344, 293, 307, 309; 430/320, 321, 323, 326, 329; 156/634, 656, 633, 664

[56] References Cited

U.S. PATENT DOCUMENTS

| | | | |
|---|---|---|---|
| 4,259,433 | 3/1981 | Mizobuchi et al. | 430/320 |
| 4,262,875 | 4/1981 | Nyman et al. | 425/810 |
| 4,478,768 | 10/1984 | Takeoka et al. | 264/106 |
| 4,615,969 | 10/1986 | Strand | 430/320 |
| 4,619,804 | 10/1986 | Leonard et al. | 264/106 |
| 4,650,735 | 3/1987 | De Laat | 430/320 |
| 4,723,903 | 2/1988 | Okazaki et al. | 425/385 |
| 4,729,940 | 3/1988 | Nee et al. | 430/323 |
| 4,876,042 | 10/1989 | Imataki et al. | 264/107 |
| 4,953,385 | 9/1990 | Aoki et al. | 425/810 |
| 4,975,310 | 12/1990 | Nagano | 264/106 |
| 5,009,818 | 4/1991 | Arai et al. | 264/106 |
| 5,051,340 | 9/1991 | Tyan et al. | 430/320 |

FOREIGN PATENT DOCUMENTS

| | | |
|---|---|---|
| 0155000 | 9/1985 | European Pat. Off. . |
| 0176684 | 4/1986 | European Pat. Off. . |
| 0239188 | 9/1987 | European Pat. Off. . |
| 60-195749 | 10/1985 | Japan . |
| 61-3339 | 9/1986 | Japan . |
| 63-50937 | 3/1988 | Japan . |
| 8606203 | 10/1986 | World Int. Prop. O. . |

*Primary Examiner*—Jay H. Woo
*Assistant Examiner*—Duane S. Smith
*Attorney, Agent, or Firm*—Antonelli, Terry, Stout & Kraus

[57] ABSTRACT

According to the present invention, etching is used to form a concave and convex pattern corresponding to information on an embossing metal mold comprising a conductive layer and a layer which includes an Ni electric-plating layer, or an Ni electric-plating layer, so that the surface of the embossing metal mold will not be contaminated even if processing conditions are somewhat changed, and that the mold will have less defects. Thus, optical disk substrates of high quality can be produced. Besides, time required for manufacturing a stamper can be shortened.

9 Claims, 4 Drawing Sheets

EMBOSSING METAL HOLD

BACKGROUND OF THE INVENTION

The present invention relates to an embossing metal mold for transferring a fine concave and convex pattern of information to the surface of an optical disk substrate for recording/reproducing the information optically, and also to a manufacturing method thereof.

Since one bit which is a unit of information signals can be stored in a size of 1 μm or less on an optical disk substrate, optical disks have been remarkably appreciated as high density and larger capacity media. As a substrate of such an optical disk, there are known three types in accordance with purposes, i.e., a substrate for an read-only optical disk, a substrate for an write once optical disk, and a substrate for an erasable optical disk. A concave and convex pattern corresponding to information, including pits corresponding to information or address pits and grooves for tracking a laser beam accurately, is formed on the optical disk substrate. Such optical disk substrates are mass-produced in such a manner that a concave and convex pattern corresponding to information is transferred thereto by a stamper, on which the concave and convex pattern corresponding to information is formed, in the injection mold method, the compression mold method or the 2P (Photo-Polymerization) method.

As disclosed in Japanese Patent Unexamined Publication No. 60-195749, a conventional stamper is manufactured in the following manner: a photo resist layer 3 is formed on a glass substrate 13; a concave and convex pattern corresponding to information is formed on the photo resist layer 3 as a result of exposure to laser light 4 for recording which is modulated by information signals, and development; a master disk thus produced is then baked at 140° C.; a conductive layer 1 which is a metallic layer of Ni or the like is formed on the surface of the photo resist layer 3; an Ni electric-plating layer 2 is formed on the conductive layer 1 which functions as an electrode; the layers 1, 2 and 3 are peeled from the glass substrate 13; and the photo resist layer 3 is removed (see FIG. 2).

The thickness of the stamper used in the injection mold method and the compression mold method is concerned with the durability of the stamper with respect to a pressure of several tens tons/cm$^2$, a heat cycle of 100° C. to 300° C. and so forth in the molding process. When the thickness of the stamper is small, its strength for pressure is insufficient, and the durability against the pressure is accordingly inadequate. When the thickness of the stamper is large, non-uniform internal strain is generated due to the heat cycle, thereby causing cracks in it. With such a stamper, therefore, it is impossible to produce a large number of substrates. Taking these matters into account, the stamper preferably has a thickness of about 300 μm in general.

The Ni electric-plating process employed for manufacturing the stamper is a method in which a master disk is placed in an electrolytic solution of Ni sulfaminate acid so as to form an Ni electric-plating layer thereon according to the electrolysis method. An important factor in the Ni electric-plating process is that the plating treatment is carried out under such plating conditions that no stress is generated in the Ni electric-plating layer. It is because, if any stress exists, the Ni electric-plating layer will be bent. However, if the plating treatment is repeated many times under the same conditions which will not cause any stress, the electrolytic solution will change in quality, and some stress may exist in the Ni electric-plating layer. When the stress in the Ni electric-plating layer is larger than adhesive strength between substances existing between the glass substrate and the Ni electric-plating layer, peeling phenomena are observed between the Ni electric-plating layer and the conductive layer or between the conductive layer and the photo resist layer or between the photo resist layer and the glass substrate, or the like (in fact, most of peeling phenomena occur between the photo resist layer and the glass substrate). Then, the electrolytic solution enters peeled portions of these layers. This electrolytic solution contaminates the surface of the conductive layer and that of the Ni electric-plating layer, so that pits and projections are left on the surface of the stamper. These pits and projections, which are different from those corresponding to information signals, are defects and result in errors. With such a stamper, optical disk substrates of high quality can not be produced. In this case, another master disk must be manufactured and subjected to the Ni electric-plating process. Thus, there is a drawback that it is extremely difficult to form a stamper from a master disk without defects and reliably.

Moreover, in response to diversifications of industries, it has recently become more necessary to gain access to information covering a wider range, and accordingly, the number of kinds of information thus required has increased. Under the circumstances, there has also been an increasing demand for forming many kinds of information on optical disk substrates in short turn around time. Usually, one kind of information is formed on the surface of a stamper. Consequently, many stampers are required for manufacturing optical disk substrates of many kinds. However, it takes, for example, ten hours or so to produce a stamper because an Ni electric-plating layer is formed to have a thickness of 300 μm in the electrolysis method. Therefore, it takes many days to prepare stampers of many kinds in the conventional method, thus resulting in another drawback that the recent demand can not be satisfied by the conventional method.

In other words, the conventional technique has a problem that it can not provide stampers as reliably and in as short turn around time as the developing industries demand.

In order to solve this problem, there is a stamper on which a pattern corresponding to information is formed by providing a photo resist layer, on which the pattern corresponding to information is formed, on a flat metallic plate which is polished with accuracy, and etching it with the photo resist layer serving as a mask on it, as disclosed in Japanese Patent Unexamined Publication No. 63-50937. However, polishing of the metallic plate can not be performed uniformly owing to impurities which the plate material may contain, and its remaining roughness will not be sufficiently reduced. Thus, there is induced a new problem that the S/N of read-out signal will not be improved. Further, an Ni substrate, of which surface is coated by Cr layer or the like by sputtering is disclosed in Japanese Patent Unexamined Publication No. 61-3339. However, it is not favorable because the roughness is greatly affected by the sputtering conditions and because the adhesive strength between the Ni substrate and the Cr layer is inadequate.

SUMMARY OF THE INVENTION

It is an object of the present invention to solve the above-described problems of the conventional technique and to provide a stamper of high quality which is suitable for producing optical disk substrates and the like of high quality on which a pattern corresponding to information is formed favorably and a manufacturing method for forming such stamper in short turn around time.

The embossing metal mold (stamper) of the invention can be provided by a mirror-like substrate having pattern corresponding to no information with a photo resist layer, forming a pattern corresponding to information on the photo resist layer, and etching the mirror-like substrate. With the embossing metal mold of the invention, there can be produced optical disk substrates of high quanlity.

The embossing metal mold according to the invention is characterized in that the mirror-like substrate is manufactured by use of a photo resist coated on a glass substrate, and the metal mold comprises a conductive layer and a layer which includes an Ni electric-plating layer, or an Ni electric-plating layer, and that the pattern corresponding to information is formed on the surface of the conductive layer or the surface of the Ni electric-plating layer.

A first characteristic of the present invention resides in an embossing metal mold comprising a conductive layer and a Ni electric-plating layer, wherein the thickness of at least the conductive layer is changed by producing concaves or convexes corresponding to information, A second characteristic of the invention resides in an embossing metal mold comprising a conductive layer and a Ni electric-plating layer, wherein pits and projections of a pattern corresponding to information are formed by etching.

A third characteristic of the invention resides in an embossing metal mold having an Ni electric-plating layer, wherein a mirror-like substrate with no pattern corresponding to information, which comprises a conductive layer and the Ni electric-plating layer, is processed in such a manner that concaves or convexes corresponding to information are formed in the Ni electric-plating layer. The above-mentioned process is, preferably, etching.

A fourth characteristic of the invention resides in a manufacturing method of an embossing metal mold which is used when transferring concaves or convexes corresponding to information to the surfaces of optical disk substrates, which metal mold comprises a conductive layer and a Ni electric-plating layer, wherein the manufacturing method comprises the steps of: coating, with a photo resist layer, the surface of a mirror-like substrate without any pattern corresponding to information, which substrate is obtained by coating a photoresist on a glass substrate forming thereon a conductive layer and an Ni electric-plating layer, peeling these layers from the glass substrate, and removing the photoresist on the conductive layer forming the concave and convex pattern corresponding to information on the photo resist layer after coating a photo resist on the mirror-like substrate; transferring the concave and convex pattern corresponding to information to the surface of the mirror-like substrate by etching; and removing the photo resist layer. The removing process and the coating process after that can be deleted by using a high heat resistance photoresist.

It is preferable that the surface of the conductive layer is oxidized before the formation of said photoresist layer until its reflectivity becomes 50% or less, or that an anti-reflection layer or an absorption layer is formed on the surface of the conductive layer.

Also, preferably, a supporting plate is bonded to the rear surface of the mirror-like substrate with no pattern corresponding to information, and then a pattern corresponding to information is formed on the surface of the mirror-like substrate.

Further, the mirror-like substrate with no pattern corresponding to information, which comprises the conductive layer and the Ni electric-plating layer, may include a second Ni electric-plating layer with a peel layer interposed therebetween.

In the case of the embossing metal mold of the invention, a pattern corresponding to information is formed on the surface of the stamper by etching with the photo resist layer serving as a mask on it. Consequently, no stress is generated in the stamper during the formation of information pattern, and the stamper is free from any attaching substances which may turn out to be defects, so that the stamper of high quality can be manufactured reliably. Thus, there can be produced optical disk substrates including optical disk itself of high quality on which a pattern corresponding to information is formed favorably.

Moreover, since the mirror-like substrate is manufactured by use of the undeveloped photo resist coated on the glass substrate, optical disk substrates having high S/N can be produced. Furthermore, transfer of a pattern corresponding to information to the stamper is performed by etching process, and therefore, the stamper can be manufactured in short turn around time.

DETAILED DESCRIPTION OF THE PREFERRED EMBODIMENT

FIGS. 1A to 1E illustrate manufacturing steps of an embossing metal mold according to the present invention. A mirror-like substrate which provides a substrate for the embossing metal mold comprises a conductive layer 1 and an Ni electric-plating layer 2, and the mirror-like substrate is formed by Ni electric-plating after the formation of a conductive layer on a master disk on which a pattern corresponding to information is not yet formed. The thickness of the Ni electric-plating layer 2 is about 300 μm [FIG. 1A].

Figure 1A:
FIG. 1A to FIG. 1E are views illustrative of manufacturing steps of an embossing metal mold according to the present invention.
Figure 1B:
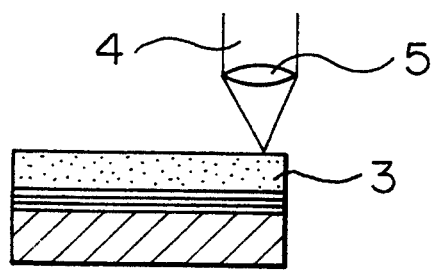
Figure 1C:
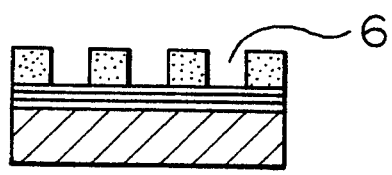

The mirror-like substrate is coated with a positive photo resist layer 3, and the photo resist layer 3 is exposed to light of laser 4 which is modulated by information signals and focused by a lens 5, After the development of the photo resist layer 3, a concave and convex pattern corresponding to information 6 is formed in the photo resist layer 3 [FIG. 1B, FIG. 1C].

Figure 1D:
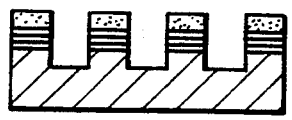
Figure 1E:
Figure 2A:
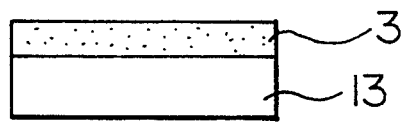
FIG. 2A to FIG. 2D are views illustrative of manufacturing steps of a conventional embossing metal mold.
Figure 2B:
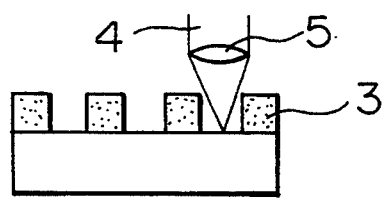
Figure 2C:
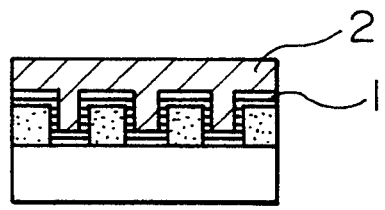
Figure 2D:
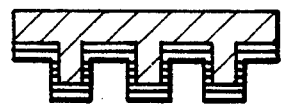

Having the photo resist layer 3 on which the pattern corresponding to information 6 is formed on the mirror-like substrate by wet etching or dry etching such as sputtering by Ar ion is conducted to thereby form the pattern corresponding to information 6 on the conductive layer 1 of the mirror-like substrate [FIG. 1D]. Concave and convex portions in the pattern corresponding to information 6 of the conductive layer 1 can be arranged to have a desired level difference precisely by controlling the etching time.

Then, the photo resist layer 3 is removed by a solvent such as acetone, or $O_2$ asher. Thus, the stamper of the embossing metal mold is produced [FIG. 1E].

When a negative photo resist layer is used in place of the positive photo resist layer, a stamper of an embossing metal mold for a reversely concave and convex pattern corresponding to information will be manufactured.

In the above-described manufacturing method of the embossing metal mold, portions not to be etched are coated with the photo resist layer 3 so as to perform etching of the pattern corresponding to information 6 alone. After removal of the photo resist layer 3, therefore, only pits and projections corresponding to the pattern corresponding to information 6 are formed on the surface of the stamper. Thus, the stamper of the embossing metal mold of high quality without defects can be produced.

Moreover, as an additional advantageous effect in the case of the embossing metal mold described above, time required for manufacturing the stamper can be shortened. For instance, the pattern corresponding to information 6 can be formed on the conductive layer 1 of the mirror-like substrate by dry etching in several minutes, and also, it takes several minutes to remove the remaining photo resist layer 3. As a result, taking into account operations such as evacuation of the apparatus, the embossing metal mold of the present invention can be produced in one hour and a half.

Figure 3:
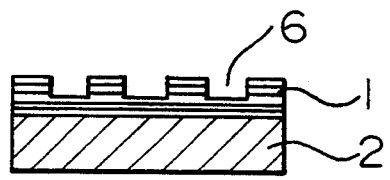
FIG. 3 is a view showing an embossing metal mold in which a pattern corresponding to information is formed on a conductive layer.

Pits and projections of the pattern corresponding to information 6 are usually shaped to have a level difference of $\lambda/4n$ ($\lambda$: a laser wavelength of an read-out optical head, n: a refractive index of the substrate), which is about 140 nm. When the thickness of the conductive layer 1 is not more than 140 nm, projections formed of the conductive layer 1 and pits defined in the Ni electric-plating layer 2 constitute the surface of the embossing metal mold. In the case that optical disk substrates are manufactured in the injection mold method or the compression mold method using this embossing metal mold, there is a problem that peeling between the conductive layer 1 and the Ni electric-plating layer 2 occurs at the pits to thereby make the manufacture of the optical disk substrates impossible. This problem can be solved when pits of the surface of the embossing metal mold are also defined in the conductive layer 1. More specifically, as shown in FIG. 3, the thickness of the conductive layer 1 is made not less than 140 nm so that pits and projections of the pattern corresponding to information 6 will be formed in the conductive layer 1 alone. When using an embossing metal mold whose conductive layer 1 has a thickness of 200 nm, optical disk substrates of high quality without defects can be mass-produced.

Figure 4A:
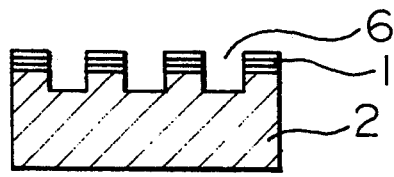
FIG. 4A and FIG. 4B are views showing an embossing metal mold in which a pattern corresponding to information is formed on an Ni electric-plating layer.
Figure 4B:
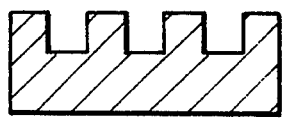

FIG. 4A and FIG. 4B illustrate second measures for solving the above-mentioned problem. The embossing metal mold having projections of the conductive layer 1 and pits in the Ni electric-plating layer 2 [FIG. 4A] is further subjected to etching treatment until the conductive layer 1 is removed. As a result, there is obtained the embossing metal mold in which pits and projections of the pattern corresponding to information 6 are only formed in the Ni electric-plating layer 2 [FIG. 4B]. When using this embossing metal mold, optical disk substrates of high quality without defects can be mass-produced similarly.

In the process of exposing the photo resist layer on the mirror-like substrate to the light of information signals, when the reflectivity of the surface of the mirror-like substrate is high, the reflected light reaches a laser light source for recording information to cause interference which will make a quantity of laser output unsteady. Further, an interference phenomenon of incident light and reflected light of the laser light is observed in the photo resist layer. This interference phenomenon influences the configuration of the pattern corresponding to information on the photo resist layer in such a manner that the level difference between pits and projections of the pattern corresponding to information is decreased, that the pits and projections have small corrugated shapes, and that the dimensions of the pattern corresponding to information is enlarged or lessened, resulting in a problem that the working accuracy is deteriorated. If such a pattern corresponding to information is reproduced, there is another problem that the S/N is decreased.

Figure 5:
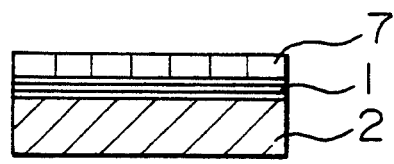
FIG. 5 is a view showing a mirror-like substrate having low reflectivity.

FIG. 5 illustrates a mirror-like substrate of low reflectivity. The above problem can be solved, as shown in FIG. 5, by forming the surface of the mirror-like substrate into an oxidized layer 7 by $O_2$ asher or the like in order to reduce the reflectivity to 50% or less after said removing process of said photoresist layer. When a photo resist layer is formed on such a mirror-like substrate and exposed to light of information signals, the configuration of a pattern corresponding to information will be free from the above problem and can be worked with accuracy. The S/N of reproduced signals will be also improved.

Further, substantially the same effect can be obtained if an anti-reflection layer or an absorption layer is formed instead of the oxidized layer 7.

In the process of exposing the photo resist layer on the mirror-like substrate to the light of information signals, the auto-focus control range of the lens 5 is ±50 μm. Consequently, working of a patttern corresponding to information can be conducted accurately so long as the flatness of the surface of the mirror-like substrate is 20 μm or less. However, since the thickenss of the mirror-like substrate is as small as about 300 μm, it is difficult to maintain the flatness of 20 μm or less at the time of exposure.

Figure 6:
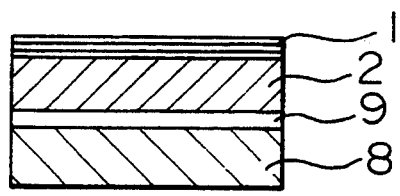
FIG. 6 is a view showing a mirror-like substrate having a flattened surface.

A method of maintaining the flatness of the surface of the mirror-like substrate at 20 μm or less will now be described referring to a flat mirror-like substrate of FIG. 6. A mirror-like substrate is secured, by an adhesive layer 9, on a supporting plate 8 which is processed accurately to have a surface flatness of 10 μm or less. When the flat mirror-like substrate is formed in this manner, the flatness of the surface of the mirror-like substrate can be made not more than 20 μm. The flatness can be improved more effectively by pressing the surface of the mirror-like substrate shown in FIG. 6 when the adhesive layer 9 is cured. The supporting plate 8 is made of a metal such as Al, Ni and Fe, an alloy of these metals such as stainless steel and duralumin or glass, ceramic, plastic or the like. The supporting plate 8 may have any thickness so long as it can be machined accurately to have a surface flatness of 10 μm or less. When the supporting plate 8 is peeled from the flat mirror-like substrate, an embossing metal mold can be obtained. This peeling operation follows either the step of forming a pattern corresponding to information on a photo resist layer or the etching step of the pattern corresponding to information.

Figure 7:
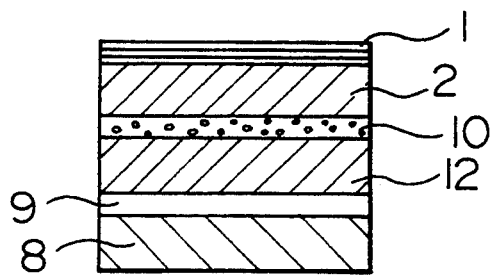
FIG. 7 is a view showing a mirror-like substrate which facilitates peeling operation.

As the embossing metal mold has a larger size, peeling operation of the supporting plate 8 from the flat mirror-like substrate is more difficult because the area of the adhesive layer 9 becomes larger. A structure of a mirror-like substrate which facilitates peeling operation is shown in FIG. 7. A first Ni electric-plating layer 2 is formed on a conductive layer 1, and a peeling assist layer 10 is formed on the rear surface of the first Ni electric-plating layer 2. The peeling assist layer 10 is, for example, an oxidized layer by O$_2$ asher or the like. Further, a second Ni electric-plating layer 12 is formed on the peeling assist layer 10. Thus, the mirror-like substrate is constituted. The flat mirror-like substrate is manufactured, and an embossing metal mold is obtained by peeling operation between the first and second Ni electric-plating layers 2 and 12. The peeling operation is easily done if the adhesive strength of the peeling assist layer 10 is made weaker than that of the adhesive layer 9. Since the second Ni electric-plating layer 12 is not used in an apparatus of manufacturing optical disk substrates, its thickness may be 300 μm, more or less.

In the case of the embossing metal mold of the present invention, etching is employed in a method of forming the convexes or concaves corresponding to information instead of electric-plating which requires process time of several hours. As a result, time for manufacturing the stamper can be greatly shortened in comparison with the conventional technique. Therefore, many kinds of stampers can be prepared in short turn around time.

Figure 8:
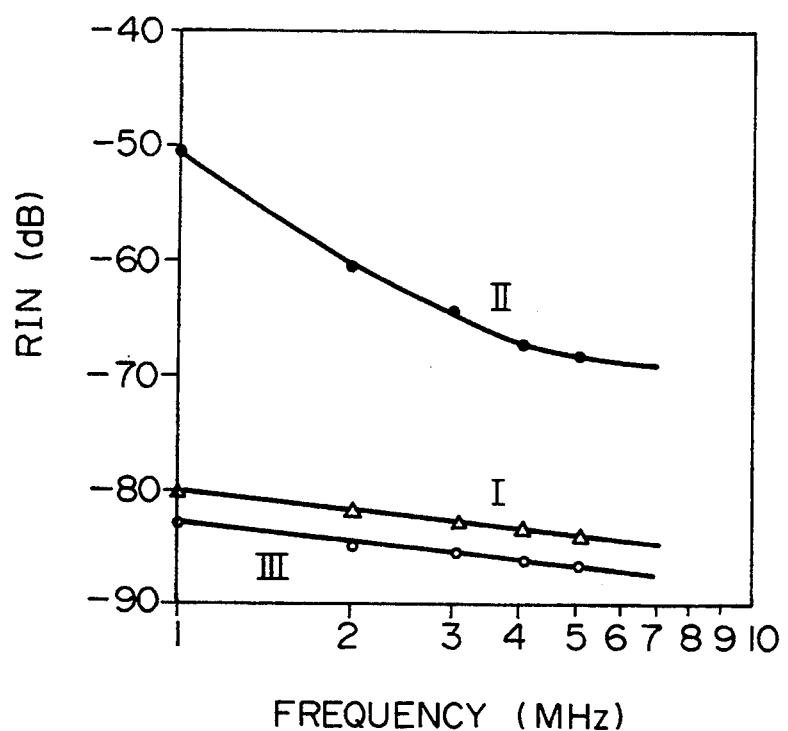
FIG. 8 is a graph of signals corresponding to the roughness of conventional stampers and that of the embossing metal mold of the invention.

FIG. 8 illustrates results of evaluating the roughness of conventional stampers and that of the embossing metal mold of the present invention on the basis of the output signal level of an read-out optical head. The output signal level is a relative intensity noise (RIN). Reference numeral I represents a conventional stamper with Ni electric-plating. Reference numeral II represents a conventional stamper having a flat plate made of a metal (Ni) which is polished with accuracy. Reference numeral III represents the embossing metal mold of the invention.

When the RIN of the mold III is compared with that of the stamper I at a frequency element of 3 MH$_z$, the former is smaller than the latter by 3 dB, and accordingly, the roughness of the mold III is smaller than that of the stamper I. It is because the mold III has the surface to which the undeveloped photo resist surface has been transferred while the stamper I has the surface to which the developed photo resist surface has been transferred. The photo resist surface is slightly melted by the development even if it is unexposed. Consequently, the roughness of the photo resist surface which is melted becomes larger than that of the undeveloped surface.

The RIN of the stamper II is larger than that of the mold III by 21 dB, and accordingly, the roughness of the stamper II is larger than that of the stamper III. It is because, even if the flat metallic (Ni) plate is polished accurately, polishing of the plate can not be performed uniformly owing to impurities which the plate material may contain, so that the plate will not be well polished in some small regions, thereby not making the roughness small.

On the other hand, as for the embossing metal mold of the invention, the roughness can be made adequately small, and consequently, optical disk substrates having high S/N can be produced.

According to the present invention, the concave and convex pattern corresponding to information is formed on the embossing metal mold by etching, so that the surface of the embossing metal mold will not be contaminated even if the conditions of the treatment are somewhat changed, and that the mold will have less defects, thus producing optical disk substrates of high quality.

What is claimed is:

1. An embossing metal mold for use in manufacture of optical disk substrates, said metal mold comprising a Ni conductive layer and a Ni electric-plating layer in contact with said conductive layer, wherein the thickness of portions of at least said conductive layer is changed by etching to produce concaves and convexes corresponding to information on a surface of said embossing metal mold.

2. An embossing metal mold for use in manufacture of optical disk substrates, said metal mold comprising a Ni conductive layer and a layer in contact with the conductive layer which includes a Ni electric-plating layer, wherein concaves and convexes corresponding to information are formed on a surface of the metal mold by etching the Ni conductive layer and the Ni electric-plating layer.

3. An embossing metal mold for use in manufacture of optical disk substrates, said metal mold comprising a Ni conductive layer and a Ni electric-plating layer in contact with the Ni conductive layer, concaves and convexes corresponding to information being formed on a surface of the metal mold by etching into said Ni electric-plating layer, said embossing metal mold being in the form of a substrate having a mirrored surface with no pattern corresponding to information prior to the formation of said concaves and convexes corresponding to information and said Ni conductive layer being initially formed on a glass substrate followed by formation of said Ni electric-plating layer to form said substrate and a photoresist pattern being produced on said substrate by forming a photoresist layer on said substrate, by exposing the photoresist layer to light and by developing the photoresist prior to the formation of the concaves and convexes by etching.

4. An embossing metal mold according to claim 1, wherein a supporting plate is bonded to a rear surface of said Ni electric-plating layer prior to the formation of said concaves and convexes by etching.

5. An embossing metal mold according to claim 2, wherein the concaves are formed in the Ni electric-plating layer and the convexes are formed in the Ni conductive layer.

6. An embossing metal mold according to claim 1, wherein both the concaves and convexes are formed in said Ni conductive layer.

7. An embossing metal mold according to claim 3, wherein said concaves are formed in said Ni electric-plating layer and said convexes are formed in said Ni conductive layer.

8. An embossing metal mold according to claim 1, further comprising an oxidized layer of an anti-reflection layer on a surface of said conductive layer, of which reflectivity is no more than 50%.

9. An embossing metal mold according to claim 1, further comprising an oxidized layer of an absorption layer on a surface of said Ni conductive layer, of which reflectivity is no more than 50%.

* * * * *